United States Patent [19]

Peterson et al.

[11] Patent Number: 4,915,560
[45] Date of Patent: * Apr. 10, 1990

[54] ANTI-CROSS THREADING FASTENER

[75] Inventors: Francis C. Peterson, Woodbury; Jeffrey C. Bergren, Berlin, both of Conn.

[73] Assignee: Buell Industrial, Inc., Waterbury, Conn.

[*] Notice: The portion of the term of this patent subsequent to Dec. 6, 2005 has been disclaimed.

[21] Appl. No.: 234,891

[22] Filed: Aug. 22, 1988

Related U.S. Application Data

[63] Continuation-in-part of Ser. No. 34,010, Apr. 2, 1987, Pat. No. 4,789,288.

[51] Int. Cl.⁴ .............................................. F16B 35/00
[52] U.S. Cl. ..................................... 411/386; 411/386
[58] Field of Search ............... 411/337, 378, 386, 387, 411/411, 412, 416, 417, 423, 426

[56] References Cited

U.S. PATENT DOCUMENTS

| 126,366 | 4/1972 | Wills | 411/387 |
|---|---|---|---|
| 2,167,910 | 8/1939 | Rottenburg | 411/386 |
| 2,251,495 | 8/1941 | Owen | 411/378 |
| 3,438,299 | 4/1969 | Gutshall | 411/387 |
| 3,724,315 | 4/1973 | Sygnator | 85/47 |
| 3,835,495 | 9/1974 | Synator | 10/10 |
| 3,863,526 | 2/1975 | Sygnator | 76/107 |
| 3,978,760 | 9/1976 | Muenchinger | 411/386 |
| 4,069,730 | 1/1978 | Gutshall | 411/386 |
| 4,179,976 | 12/1979 | Sygnator | 85/47 |
| 4,486,135 | 12/1984 | Kazino | 411/387 |
| 4,534,690 | 10/1983 | Barth | 411/386 |
| 4,630,985 | 12/1986 | Simons | 411/386 |
| 4,789,288 | 12/1988 | Peterson | 411/386 |

FOREIGN PATENT DOCUMENTS

| 120691 | 7/1943 | Australia | 411/417 |
|---|---|---|---|
| 2913482 | 10/1980 | Fed. Rep. of Germany | 411/387 |
| 484871 | 11/1936 | United Kingdom | 411/386 |
| 2127927 | 4/1984 | United Kingdom | 411/386 |

Primary Examiner—Gary L. Smith
Assistant Examiner—F. Saether
Attorney, Agent, or Firm—St. Onge Steward Johnston & Reens

[57] ABSTRACT

A threaded fastener for preventing cross threading comprises a head, a cylindrical threaded shank projecting from the head, and a tip section formed on the end of the shank opposite the head. The tip section has a generally circular cross-section and has at least one and preferably two partial threads formed on it. The tip section may be generally cylindrical, conical, frusto-conical or bullet shaped. A method of manufacturing an anti cross thread fastener comprises forming a fastener blank with a shank portion joined to a tip section having a tip threading side and a reduced radius side, and applying threads thereto.

22 Claims, 2 Drawing Sheets

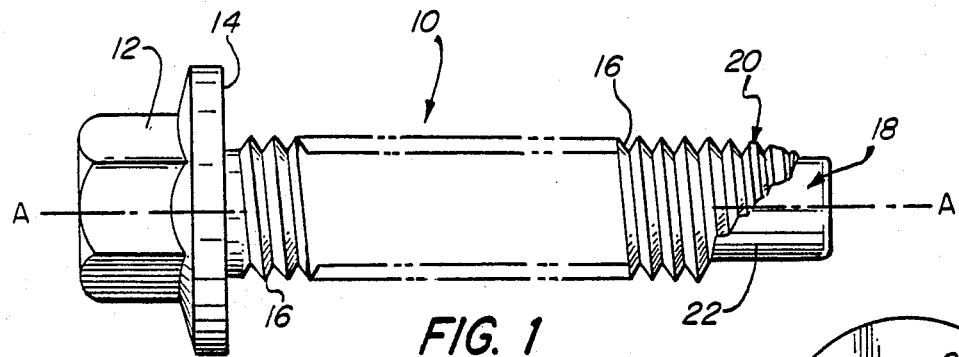
FIG. 1
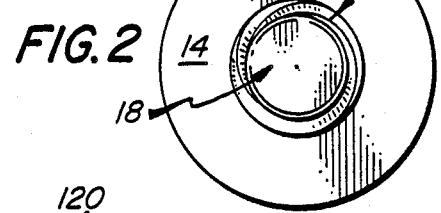
FIG. 2
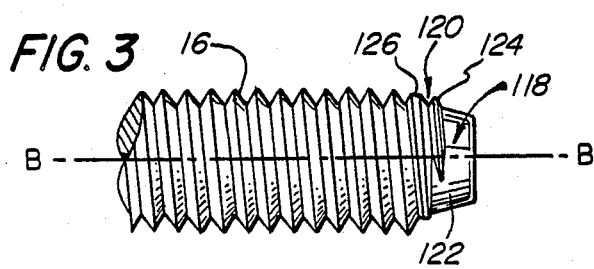
FIG. 3
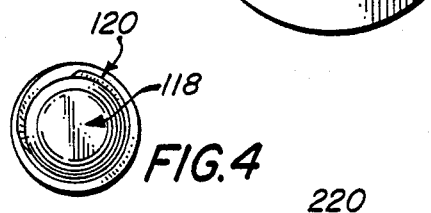
FIG. 4
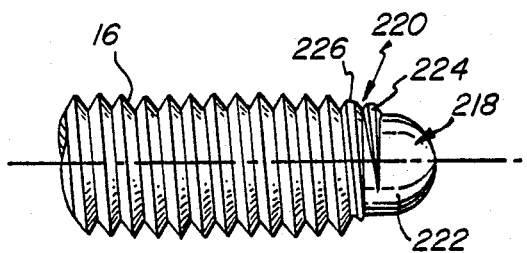
FIG. 5
FIG. 6
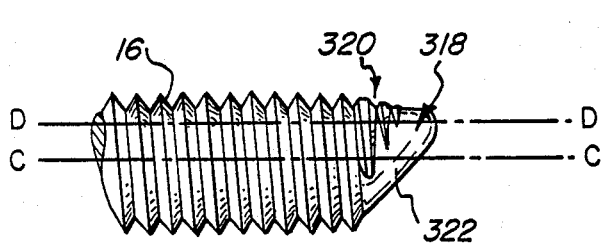
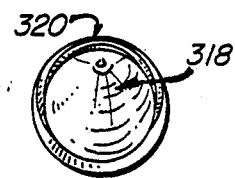
FIG. 7
FIG. 8

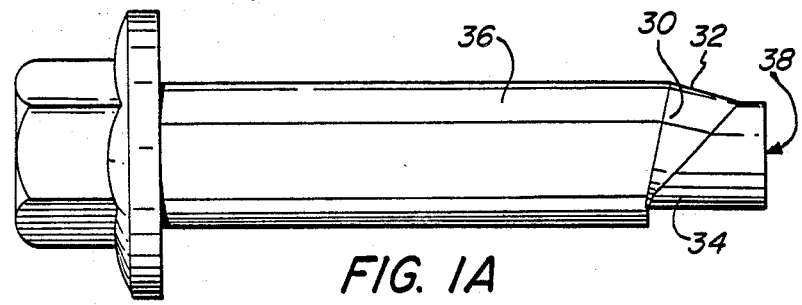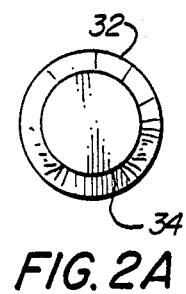
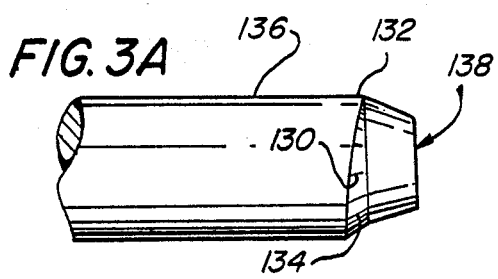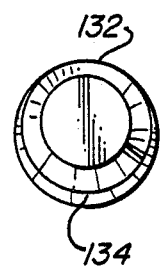
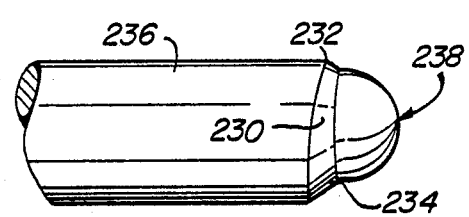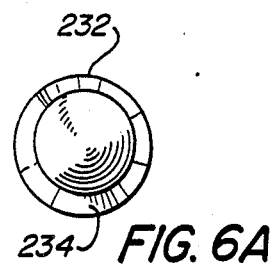
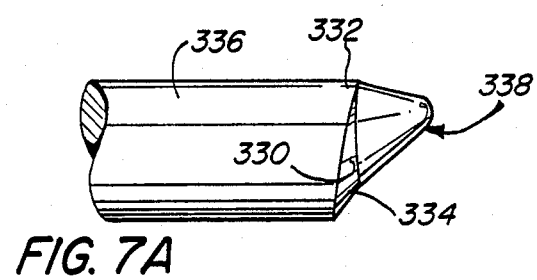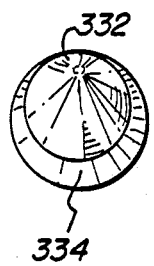
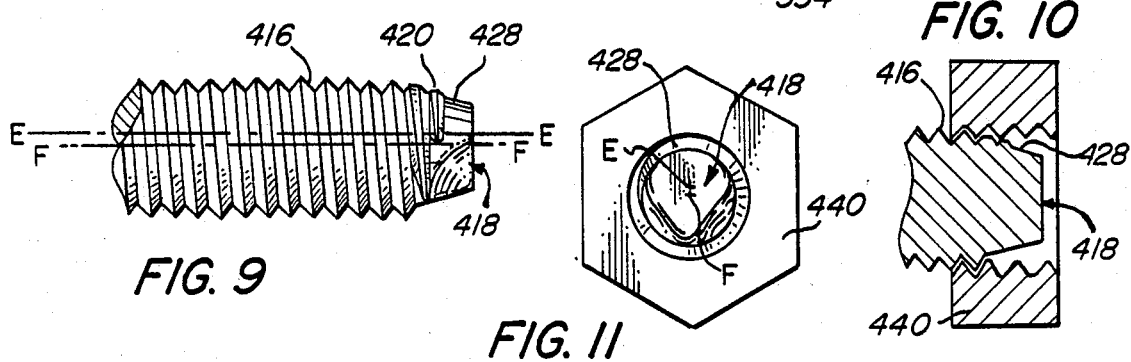

ANTI-CROSS THREADING FASTENER

The present application is a continuation-in-part of U.S. Application Ser. No. 034,010 filed Apr. 2, 1987, now U.S. Pat. No. 4,789,288, and entitled "Anti-Cross Threading Screw".

FIELD OF THE INVENTION

The present invention relates to screws and other male threaded fasteners which prevent cross threading when the male fastener is threaded together with a matching female threaded fastener.

DESCRIPTION OF THE PRIOR ART

Threaded male fasteners such as machine screws or bolts are typically used with female threaded fasteners such as nuts or screw threaded bores. In many cases, such male fasteners are not properly aligned with the nut or threaded bore before torque is applied to it, causing cross threading of the male fastener and the nut. Cross threading can damage the threads on both the male fastener and the nut, and can cause the male fastener and nut to seize together. When a fastener combination is seized, it will not tighten further, creating an insecure attachment and a variety of potential hazards such as the possibility of personal injury or damage to equipment. In addition, a seized fastener combination is difficult to separate, and the threads on the male fastener and the nut will be damaged when they are disconnected. If a threaded hole in a metal part is involved, the threaded hole will usually need to be retapped before it is used. The aforementioned problems become particularly acute in automobile assembly lines, where power tools are typically used to torque fasteners together. When a power tool is used, the likelihood of cross threading is increased when a male fastener is not properly aligned with the female bore when torque is applied. Cross-threading of fastener parts in an automobile assembly line is costly, requiring time and money to remove and repair or replace the cross threaded fasteners. Such cross threading may also slow down the entire production line, reducing productivity and increasing production costs.

SUMMARY OF THE INVENTION

One object of the present invention is to provide a male threaded fastener which prevents cross threading and its associated problems. More particularly, the present invention provides a male threaded fastener which when inserted into a female threaded part will seat the male threading against the female threading so that they are in phase such that the male fastener can be torqued and threaded squarely into the female fastener with a substantially reduced likelihood of cross threading.

This object, and other objects which will become apparent from the description which follows, are achieved by a male threaded fastener comprising a threaded shank section, and a partially threaded tip section, preferably having a generally circular cross-section.

The tip section may have a variety of shapes, and may be generally cylindrical, conical, frusto-conical or bullet shaped. The tip section may also be lobular, that is, it may be formed with lobes separated by axial depressions. There is at least one partial thread, and preferably two partial threads, formed on one side of the tip section. In one preferred embodiment, the tip section is offset from the central axis of the threaded shank.

The fastener of the present invention operates to prevent cross threading because only the partial threads of the tip section seat against and engage the threads of the female fastener then the tip section is inserted into the female fastener, so that when the male fastener is rotated to engage it with the female fastener, the seated partial threads are already in phase with the female fastener threading, and allow the threads on threaded shank section of the male fastener to thread squarely into the female fastener without cross-threading.

It has also been found that the fastener of the present invention, when used with power tools, will hunt for and find the aperture of the female fastener. In addition, the fastener of the present invention will cut through paint or other coatings in the female fastener which would prevent secure fastening.

It has been found that the use of the fastener of the present invention provides a substantial cost savings when used in an assembly line environment. The fastener greatly reduces the incidence of cross threading, providing a savings of time and money.

BRIEF DESCRIPTION OF THE DRAWINGS

FIG. 1 is a side elevation view of an embodiment of a fastener of the present invention with a generally cylindrical tip section.

FIG. 1A is a side elevation view of a blank of the fastener of FIG. 1.

FIG. 2 is an end elevational view of the fastener and matching part of FIG. 1.

FIG. 2A is an end elevation view of the blank of FIG. 1A.

FIG. 3 is a side elevation view of a generally frusto-conical tip section of an embodiment of the present invention.

FIG. 3A is a side elevation view of a blank of the fastener tip section of FIG. 3.

FIG. 4 is an end elevation view of the tip section of FIG. 3.

FIG. 4A is an end elevation view of the blank of FIG. 3A.

FIG. 5 is a side elevation view of a generally bullet-shaped tip section of an embodiment of the present invention.

FIG. 5A is a side elevation view of a blank of the fastener section shown in FIG. 5.

FIG. 6 is an end elevational view of the tip section of FIG. 5.

FIG. 6A is an end elevation view of the blank of FIG. 5A.

FIG. 7 is a side elevation view of a generally conical tip section of an embodiment of the present invention.

FIG 7A is a side elevation view of a blank of the fastener tip section shown in FIG. 7.

FIG. 8 is an end elevational view of the tip section of FIG. 7.

FIG. 8A is an end elevation view of the blank of FIG. 7A.

FIG. 9 is a side elevation view of a non-circular tip section of an embodiment of the invention.

FIG. 10 is a cross-sectional view of the tip section of FIG. 9.

FIG. 11 is an end elevational view of the tip section of FIG. 9.

DETAILED DESCRIPTION OF THE DRAWINGS

The invention will now be illustrated with reference to the drawings which show several embodiments of the anti-cross threading male fastener of the present invention.

Referring to FIG. 1, the male fastener shown generally as a screw 10 comprises a head 12 adapted to be engaged by a tool for applying rotational torque. For example, the head may be slotted to receive a flat or phillips head screwdriver or may be formed as shown with a hexagonal shape in plan view to provide parallel flat areas for receiving a wrench. Head 12 may have a load bearing area 14 that extends generally perpendicularly from the longitudinal axis A—A of the screw 10 or the head may be of the same diameter as the shank 16 projecting from the head 12. Shank 16 is threaded and is generally cylindrical although it may have other shapes in cross-section depending on the particular use to which the fastener is put, and may, for example, be trilobular in cross-section.

A tip section 18 is provided at the end of the shank 16 opposite the head 12. The tip section 18 has at least one partial thread 20 formed thereon. As used herein, a "partial thread" is a thread segment which does not occupy the entire circumference of shank 16 and which is discontinuous from the threading on the shank 16. In the preferred embodiment, the tip section 18 has a generally circular cross section. For example the tip section shown in FIGS. 1 and 2 is generally cylindrical. In other preferred embodiments, the screw 10 may have a generally frusto-conical tip section 118 as shown in FIGS. 3 and 4, or a generally bullet-shaped tip section 218 as shown in FIGS. 5 and 6, or it may have a generally conical tip section 318 as shown in FIGS. 7 and 8.

The term "bullet shaped" is intended to describe a variety of geometric shapes which are generally rounded or curved, and encompasses shapes such as domes, hemispheres, paraboloids and hyperboloids.

However, the tip section need not necessarily have a circular cross-section, and will still operate to minimize problems of cross threading, so long as the side of the tip section on which the at least one partial thread provides a radial surface which is a segment of a circular figure, and the entire tip section is sized to fit into its matching female fastener. For example, in FIGS. 9-11, a threaded shank 416 having embodiment of the anti-cross threading tip is shown. The tip section 418 is generally triangular in cross section as shown in FIG. 11 and includes in cross-section a segment of a circle having a ray length substantially equal to the radius of the shank 16. A radial surface 428 having at least one partial thread 420 formed thereon is located along the perimeter of this circular segment. The partial thread is preferably sized and oriented so that it is of the same size and pitch as the threading on the shank. The tip section 418 is sized to fit into a matching female threaded fastener, shown as a nut 4 0 in FIGS. 10 and 11.

A partial thread 20, 120, 220 or 320 comprising at least one partial thread, and preferably two partial threads is formed on the tip sections 18, 118, 218 and 318 of the various embodiments of the male fastener of the present invention shown in FIGS. 1, 3, 5 and 7. Where there is more than one partial thread 20, 120, 220 or 320 such threads are formed adjacent one another on the same side of the tip section 18, 118, 218 or 318. An unthreaded side 22, 122, 222 or 322 is provided on the opposite side of the tip sections 18, 118, 218 or 318, as shown in FIGS. 1, 3, 5 and 7.

Where there are two partial threads, as shown in FIGS. 3 and 5, preferably the first partial thread 124 or 224 adjacent the end of the tip section 118 or 218 has a circumferential length equal to about 4 to about 60 percent of the circumference of the shank 16. The second partial thread 126 or 226 adjacent the first partial thread has a circumferential length equal to between about 20 to about 70 percent of the circumference of the shank 16.

In one preferred embodiment, the central axis of the tip section is offset from the central axis of the fastener shank. For example, in FIGS. 7 and 8, the tip section 318 has a central axis D—D which is offset from the central axis C—C of the shank 16. Similarly, in FIGS. 9 and 11, the central axis of the tip section 418 shown by line E—E is offset from the central axis of the shank shown by line F—F.

The anti cross thread fastener may be made using standard screw manufacturing techniques, namely by manufacturing a screw blank by casting or extruding processes. Preferably the screw blank is manufactured by cold heading wire in a die. Threads are then cut or preferably rolled onto the screw blank by techniques known in the art.

The screw blank of the present invention most preferably is manufactured such that it has a tip section with sides of unequal ray length. On one side of the tip section is a tip threading side which has a ray length about equal to the radius of the shank. A reduced ray length side, which has a ray length which is less than the radius of the shank, is located on the opposite side of the tip section from the tip threading side. During the thread rolling step threads are only formed on the tip threading side, creating the partial threads 20, 120, 220 or 320.

For example, in FIG. 1A, the tip section 38 of a screw blank corresponding to the fastener of FIG. 1 has a tip threading side 32 which is substantially contiguous with and is an extension of the radial surface of the shank portion 36, and has a ray length about equal to the radius of the shank portion 36. It is on this side that the partial threads 20 of FIG. 1 are formed during the thread rolling step. Opposite the tip threading side is the reduced ray length side 34. Reduced ray length side 34 has a ray length which is sufficiently less than the radius of the shank 36 so that no threads are formed thereon during the thread rolling step, thereby forming the unthreaded side 22 of FIG. 1.

The same methods of manufacture apply to the other embodiments of the invention disclosed in FIGS. 3, 5 and 7. As can be seen in FIGS. 3A, 5A and 7A, a screw blank is formed having a tip section 138, 238 or 338 which has a tip threading side 132, 232 or 332 and a reduced ray length side 134, 234 or 334. In FIG. 7A, the tip 338 is offset as already described. The thread rolling step forms the partial threads 120, 220 and 320 of FIGS. 3, 5 and 7 on the tip threading side 132, 232 and 332 of FIGS. 3A, 5A and 7A, but does not cause threads to be formed on the reduced ray length sides 134, 234 and 334 of FIGS. 3A, 5A and 7A, so that the manufactured fastener has an unthreaded side 122, 222, 322 as shown in FIGS. 3, 5 and 7.

The tip threading sides 32, 132, 232 or 332 are preferably joined to the reduced ray length sides 34, 134, 234 or 334 by a smooth tapered segment. For example, in FIG. 1A, the tip threading side 32 is joined by tapered segment 30. Similarly, in FIGS. 3A, 5A and 7A, tapered segments 130, 230 or 330 join the two sides of the tip.

The manufacture of the blanks may be achieved by a variety of methods. For example, a standard blank with a straight cylindrical tip may be made by standard cold heading methods, and the various shapes of the tip sections 38, 138, 238 or 338 and reduced radius sides 34, 134, 234 or 334 may be formed by grinding or other shaping of the end of the blank. Alternatively the tip sections may be formed by a pinching step using an appropriate sized die to form the tip sections. However, in the most preferred method, the screw blank is made in a single step by cold heading the blank using a two part die. The two part die comprises a shank die having a cylindrical bore joined to a tip section die which forms the tip sections.

Once the blank is formed, threads are applied by thread rolling steps as are known in the art.

The male fastener prevents cross threading because the unthreaded side 22, 122 or 222 or 322 of the tip section 18, 118, 218 or 318 shown in FIGS. 1, 3, 5 and 7 slides over the female threading of a nut when the tip section is inserted into a nut, causing the partial threads on the tip section to seat against the nut threading. The screw is thus engaged on only one side with the tip section partial threads in phase with the nut threading. When the male fasteners and nut are torqued together, the partial threads act as a leader or guide so that the threaded shank 16 threads squarely into the nut without cross threading under most circumstances.

The partial threads also act as a thread cleaning structure when the male fastener is used with a female fastener which has been painted or had other coatings applied which clog the threads. The thread cleaning effect is achieved by the partial threads, which remove the paint. The discontinuity between the partial threads and the shank threading allows the paint to escape from between the fasteners instead of being retained in the female fastener where it can interfere with the secure fastening together of the parts.

When the central axis of the tip section is offset from the central axis of the shank, the anti-cross thread fastener of the present invention shows an improved ability over conventional fasteners to self-align and pilot itself into the bore of a female fastener when used with power tools. For example, when a hexagon headed screw having a tip section such as that shown in FIGS. 7 and 8 is used with an pneumatic socket wrench, the screw is typically held in a magnetic socket. The screw may be placed in a socket wrench and located adjacent a female fastener. Once the socket wrench is started, the rotating screw will hunt for and find the bore of the female fastener and will align itself with the bore of the fastener, without requiring the screw to be manually aligned and started in the bore.

Therefore, the fastener of the present invention greatly reduces problems of cross threading, and provides a substantial increase of efficiency and economy when used with power tools in an assembly line environment.

What is claimed is:

1. An anti-cross threading screw comprising:
   a head;
   a threaded shank projecting from said head, said shank having a central axis;
   a tip section formed on and joining said shank at the axial end of said shank opposite said head, said tip section having an end and a partial thread side and an unthreaded side, said tip section being generally circular in cross-section,
   said partial thread side having at least one partial thread thereon and being substantially contiguous with and an extension of the radial surface of said threaded shank, and
   said unthreaded side being located opposite said partial thread side beyond said shank axis and having a maximum ray length from said central axis of said shank which is less than said radius of said shank, said unthreaded side tapering to join said partial thread side;
   said anti-cross threading screw being threadable into a bore of a female part without cross-threading or substantial deformation of the bore of the female part.

2. An anti-cross threading screw in accordance with claim 1, wherein said tip section is generally cylindrical.

3. An anti-cross threading screw in accordance with claim 1, wherein said tip section is generally conical.

4. An anti-cross threading screw in accordance with claim 1, wherein said tip section is generally bullet shaped.

5. An anti-cross threading screw in accordance with claim 1, wherein said tip section is generally frusto-conical.

6. An anti-cross threading screw in accordance with claim 1 wherein there are two of said partial threads.

7. An anti-cross threading screw in accordance with claim 6, wherein said two partial threads comprise:
   a first partial thread located adjacent the end of said tip section having a length equal to between about 4 to about 60 percent of the circumference of said shank; and
   a second partial thread adjacent said first partial thread having a length equal to between about 20 to about 70 percent of the circumference of said shank.

8. An anti-cross threading fastener, comprising:
   a threaded shank having a central axis; and
   a tip section joined to said shank and having an end, and a partial thread side and an unthreaded side,
   said partial thread side having a plurality of partial threads thereon, and comprising in cross-section a segment of a circle having a radius determined from the central axis of said shank to the surface of said partial thread side which is substantially equal to the radius of said shank determined from the central axis of said shank to the surface of said shank, said partial thread side extending substantially to the end of said tip section, and
   said unthreaded side having a ray length determined from the central axis of said shank to the surface of said unthreaded side which is less than the radius of said shank determined from the central axis of said shank to the surface of said shank;
   said anti-cross threading fastener being threadable into a bore of a female part without cross-threading or substantial deformation of the bore of said female part.

9. An anti-cross threading fastener in accordance with claim 8, wherein there are two of said partial threads, comprising:
   a first partial thread located adjacent the end of said tip section having a circumferential length equal to between about 4 to about 60 percent of the circumference of said shank; and a second partial thread adjacent said first partial thread having a circumferential length equal to between about 20 to about 70 percent of the circumference of said shank.

10. An anti-cross threading fastener in accordance with claim 8, wherein said tip section is generally cylindrical.

11. An anti-cross threading fastener in accordance with claim 8, wherein said tip section is generally conical.

12. An anti-cross threading fastener in accordance with claim 5, wherein said tip section is generally bullet shaped.

13. An anti-cross threading fastener in accordance with claim 8, wherein said tip section is generally frusto-conical.

14. An anti-cross threading fastener in accordance with claim 8, wherein at least a portion of said tip section is substantially circular in cross-section.

15. An anti-cross threading fastener in accordance with claim 8, wherein said partial thread side and said unthreaded side of said tip section are joined by a tapered segment.

16. An anti-cross threading male fastener for fitting into a threaded bore of a female threaded part, comprising:
 a threaded shank having a central axis, the threading on said shank being adapted to engage with said female threaded part;
 a tip section formed on and joining said shank at its axial end opposite said head; said tip section having
 a partial thread side comprising in cross-section a segment of a circle which has a radius determined from the central axis of said shank to the surface of said partial thread side which is substantially equal to the radius of said shank and which is substantially contiguous with the radial surface of said shank and which is sized to fit into said female part, said partial thread side having at least one partial thread thereon adapted to engage with said threading in said female part, and
 an unthreaded side having a ray length determined from the central axis of said shank to the surface of said unthreaded side which is less than the radius of said shank and of the bore of said female threaded part;
 whereby said tip section of said anti-cross threading fastener when inserted into the threaded bore of the female part may be threaded into the female part without cross threading or substantial deformation of the bore of the female part.

17. An anti-cross threading fastener in accordance with claim 16, wherein at least a portion of said tip section is substantially circular in cross-section.

18. An anti-cross threading fastener in accordance with claim 16, wherein said partial thread side and said unthreaded side of said tip section are joined by a tapered segment.

19. An anti-cross threading fastener in accordance with claim 16, wherein said partial thread side extends substantially to the end of said tip section.

20. An anti-cross threading fastener, comprising:
 a threaded shank having a central axis; and
 a tip section having a portion which is substantially circular in cross-section, and having an end, and a partial thread side and an unthreaded side, said tip section being joined to said shank,
 said partial thread side having a plurality of partial threads thereon, and comprising in cross-section a segment of a circle having a radius determined from the central axis of said shank to the surface of said partial thread side which is substantially equal to the radius of said shank determined from the central axis of said shank to the surface of said shank, said partial thread side extending substantially to the end of said tip section, and
 said unthreaded side having a ray length determined from the central axis of said shank to the surface of said unthreaded side which is less than the radius of said shank determined from the central axis of said shank to the surface of said shank.

21. An anti-cross threading fastener in accordance with claim 20, wherein said threaded and partial thread sides of said tip section are joined by a tapered segment.

22. An anti-cross threading fastener in accordance with claim 20, wherein there are two of said partial threads comprising:
 a first partial thread located adjacent the end of said tip section having a circumferential length equal to between about 4 to about 60 percent of the circumference of said shank; and
 a second partial thread adjacent said first partial thread having a circumferential length equal to between about 20 to about 70 percent of the circumference of said shank.

* * * * *